(12) United States Patent
Zhou et al.

(10) Patent No.: US 10,514,325 B2
(45) Date of Patent: Dec. 24, 2019

(54) AUTOMATIC ASSEMBLY EQUIPMENT FOR DOOR CHECK

(71) Applicant: Guangdong Lyric Robot Intelligent Automation Co., Ltd., Guangdong (CN)

(72) Inventors: Junxiong Zhou, Guangdong (CN); Junhao Zhou, Guangdong (CN); Junjie Zhou, Guangdong (CN)

(*) Notice: Subject to any disclaimer, the term of this patent is extended or adjusted under 35 U.S.C. 154(b) by 312 days.

(21) Appl. No.: 15/782,866

(22) Filed: Oct. 13, 2017

(65) Prior Publication Data
US 2019/0041297 A1 Feb. 7, 2019

(30) Foreign Application Priority Data
Aug. 2, 2017 (CN) .......................... 2017 1 0653135

(51) Int. Cl.
| | |
|---|---|
| G01M 99/00 | (2011.01) |
| B65H 23/28 | (2006.01) |
| G01M 17/00 | (2006.01) |
| E05C 9/24 | (2006.01) |
| E05B 17/00 | (2006.01) |

(52) U.S. Cl.
CPC .......... G01M 99/008 (2013.01); B65H 23/28 (2013.01); E05B 17/0004 (2013.01); E05C 9/24 (2013.01); G01M 17/00 (2013.01); B23P 2700/50 (2013.01)

(58) Field of Classification Search
CPC . G01M 99/008; G01M 17/00; E05B 17/0004; E05C 9/24; B65H 23/28; B23P 2700/50; B23P 19/02; B23P 19/007; B23P 19/001; B21J 15/10

USPC ........................................................ 73/865.9
See application file for complete search history.

(56) References Cited

U.S. PATENT DOCUMENTS

| | | | | |
|---|---|---|---|---|
| 5,862,570 A * | 1/1999 | Lezuch | ................. | E05C 17/085 16/82 |
| 6,105,208 A * | 8/2000 | Westerdale | ........... | E05C 17/203 16/334 |
| 6,513,193 B1 * | 2/2003 | Yezersky | ............... | E05C 17/203 16/86 A |
| 8,499,416 B2 * | 8/2013 | Settsu | ..................... | E05F 5/025 16/86 B |

* cited by examiner

Primary Examiner — Nathaniel T Woodward
(74) Attorney, Agent, or Firm — Prakash Nama; Global IP Services, PLLC

(57) ABSTRACT

The invention discloses an automatic assembly equipment of door check comprising an L-shaped component semi-finished product assembly device and a finished product assembly device; the L-shaped component semi-finished product assembly device comprises a first material feeding device, a first riveting device, a first flipping device and a first large turntable, wherein the first material feeding device, the first pressing riveting device and the first flipping device are connected by the first large turntable; the finished product assembly device comprises a second material feeding device, a second riveting device, two turning devices, a material exporting device and a second turntable, wherein the second material feeding device, the second riveting device, the second flipping device and the material exporting device are arranged in turn around the second large turntable. The automatic assembly equipment for door check of this present invention is used for automatically assembling the door check.

10 Claims, 2 Drawing Sheets

AUTOMATIC ASSEMBLY EQUIPMENT FOR DOOR CHECK

BACKGROUND OF THE INVENTION

The present invention relates to the technical field of automated production for door checks, more specifically, to an automatic assembly equipment for door checks.

The door check is a component that must be used in the car, and the demand thereof is large. However, the current production of the door check is worked by the operator and the single station auxiliary machine cooperatively to flow to the next workstation of the pipeline. The following issues exist in this kind of production mode: the operator's security, such as the risk of high tonnage punch material feeding, testing mechanism material feeding, etc.; the inconsistency of material feeding by operators and shortage, resulting in high scrap rate; the production is mainly artificial with low production efficiency.

BRIEF SUMMARY OF THE INVENTION

The technical problem solved by this invention is to provide an automatic assembly device for the door check to realize the automatic assembly of the door check.

To achieve the above objective, the present invention provides an automatic assembly equipment for door check, characterized in that: it comprises an L-shaped component semi-finished product assembly device and a finished product assembly device, wherein the L-shaped component semi-finished product assembly device and the finished product assembly device are connected through a straight track; the L-shaped component semi-finished product assembly device comprises a first material feeding device, a first riveting device, a first flipping device and a first turntable, wherein the first material feeding device, the first riveting device and the first flipping device are arranged in turn around the first large turntable; the finished product assembly device comprises a second material feeding device, a second riveting device, the second flipping device, a material exporting device and a turntable, wherein the second material feeding device, the second riveting device, the second flipping device and the material exporting device are arranged in turn around the second large turntable; the L-shaped component assembly semi-finished product device is used for the assembly of the L-shaped component semi-finished product, and the finished assembly device is used for the assembly of the finished door check. The automatic assembly equipment for door check achieves the automatic assembly of the door check. Compared to artificial assembly, the automatic assembly equipment for door check greatly improves the production efficiency.

Further, the first material feeding device comprises an inner L-shaped material feeding device, an outer L-shaped material feeding device, a steel sheet material feeding device and a rivet material feeding device, wherein the inner L-shaped material feeding device and the outer L-shaped material feeding device are both manipulators, and the steel sheet material feeding device and the rivet material feeding device are vibration discs. The automatic assembly equipment for door check achieves automatically material feeding, improving the efficiency of material feeding, and avoiding the probable artificial error for material feeding.

Further, the first riveting device is a riveting device, which is used for riveting the inner L-shaped part, the outer L-shaped pieces with the steel sheet. The automatic assembly equipment for door check achieves riveting of parts, improving the product reliability.

Further, the second riveting device comprises a second pressure riveting device and a second rotary riveting device, wherein the second pressing riveting device is used for riveting the dot stopper, the non-dot stopper with the L-shaped assembly semi-finished product; the second rotary riveting device is used for riveting the resilient tab with the steel bar and the eccentric rivet with the L-shaped assembly semi-finished product. The automatic assembly equipment for door check achieves riveting of parts, improving the product reliability.

Further, the first riveting device and the second pressing riveting device are both of two pieces, which are respectively mounted on each side of the first flipping device and the second flipping device. The automatic assembly equipment for door check achieves pressure-riveting on both sides of products, improving the product reliability.

Further, the second material feeding device comprises a steel bar material feeding device, a resilient tab assembly material feeding device, a dot stopper material feeding device, a non-dot stopper material feeding device and an eccentric rivet material feeding device, wherein the steel bar material feeding device, the resilient tab assembly material feeding device, the dot stopper material feeding device, the non-dot stopper material feeding device, and the eccentric rivet material feeding device are all vibration plates. The automatic assembly equipment for door check achieves automatically material feeding, improving the efficiency of material feeding, and avoiding the probable artificial error for material feeding.

Further, the first material feeding device and the second material feeding device are provided with testing device, which is used for detecting the type and the position correction of the raw material. The automatic assembly equipment for door check can avoid the increase of abnormal items caused by incorrect material feeding or incorrect location.

Further, the testing device is a CCD testing system.

Further, the material exporting device comprises a straight track and a finished product testing device, wherein the finished product testing device respectively outputs the good product and the defective product from the straight track after testing. The automatic assembly equipment for door check finally checks the product again to avoid the outflow of defective products.

Further, the finished product testing device is a CCD testing system.

The invention has the following advantages: this invention provides an automatic assembly equipment for door check; compared with the artificial assembly, the automatic assembly equipment for door check greatly improves the production efficiency; feeding material by vibration discs and manipulators avoids the manual material feeding error or the adverse effect on production efficiency caused by untimely material feeding and so on; arranging riveting-pressure on both sides improves the reliability of the product.

Figure 1:
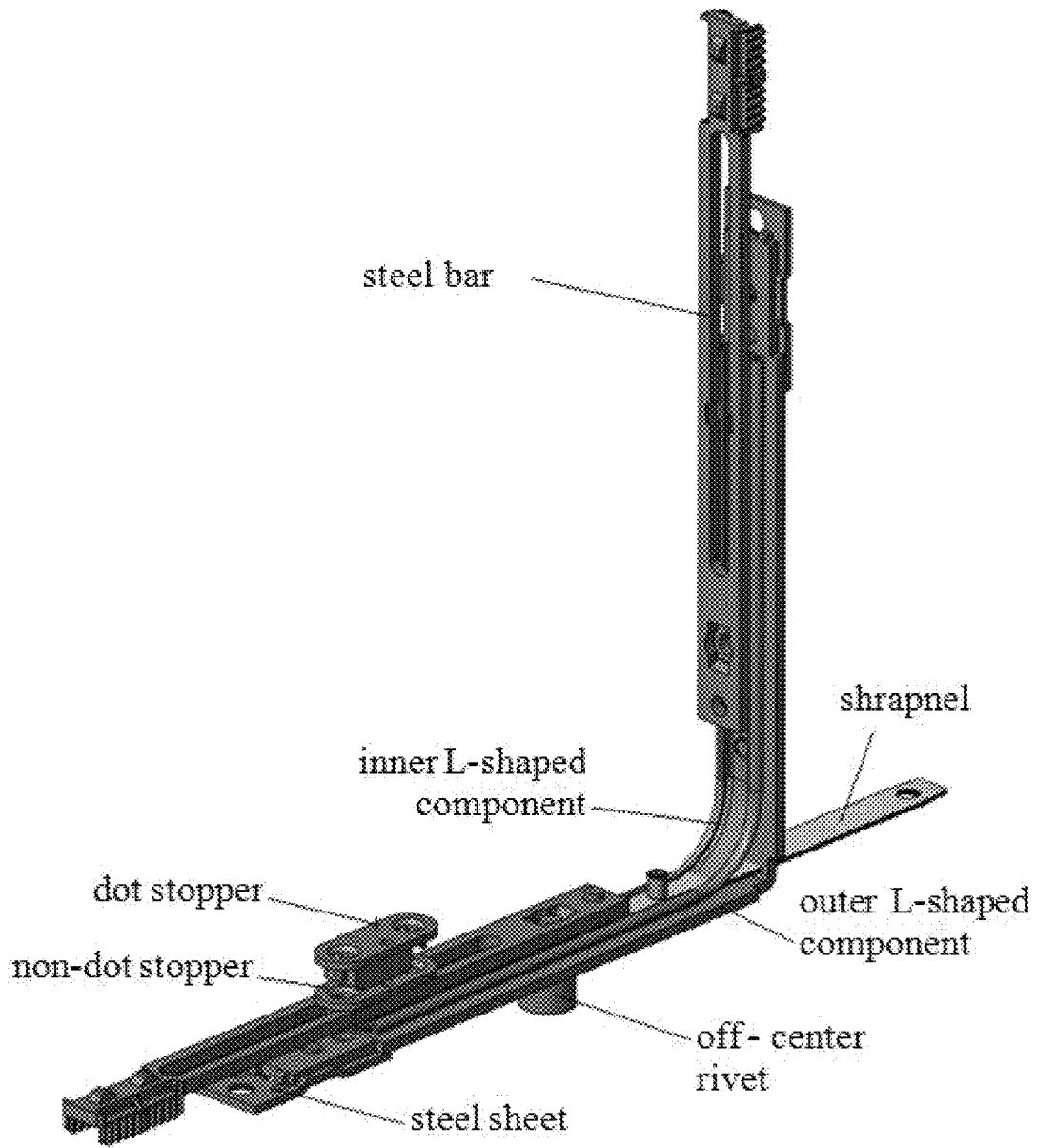
FIG. 1 is a schematic view of the structure of the present invention produced in the first embodiment.

Description of the reference numbers: 1—the L-shaped component assembly semi-finished product device, 111—the inner L-shaped material feeding device, 112—the outer L-shaped material feeding device, 113—the steel sheet material feeding equipment, 114—the rivet material feeding equipment, 12—the first riveting device, 13—the first flipping device, 14—the first oiling device, 15—the first turntable, 2—the finished assembly device, 211—the steel bar material feeding device, 212 —resilient tab assembly material feeding device, 213—dot stopper material feeding device, 214—non-dot stopper material feeding device, 215—the eccentric rivet material feeding device, 22—the second pressure riveting device, 23—the stopping point testing device, 241—the second large turntable, 242—the small turntable, 25—the second flipping device, 26—rotary riveting device, 3—the straight track.

The drawings are for illustrative purposes only and are not to be construed as limits of the present patent; for illustrating the present embodiment better, certain parts of the drawings are omitted, enlarged or reduced, and do not represent the dimensions of the actual product; it will be understandable for those skilled in the art that certain well-known structures and their descriptions may be omitted; the same or similar reference numerals refer to the same or similar parts; the terms describing the positional relationship in the drawings are for illustrative purposes only and are not to be construed as limits of the patent.

DETAILED DESCRIPTION OF THE INVENTION

The present invention will now be described in further detail with reference to the drawings and embodiments for the benefit of those skilled in the art.

Embodiment 1

Figure 2:
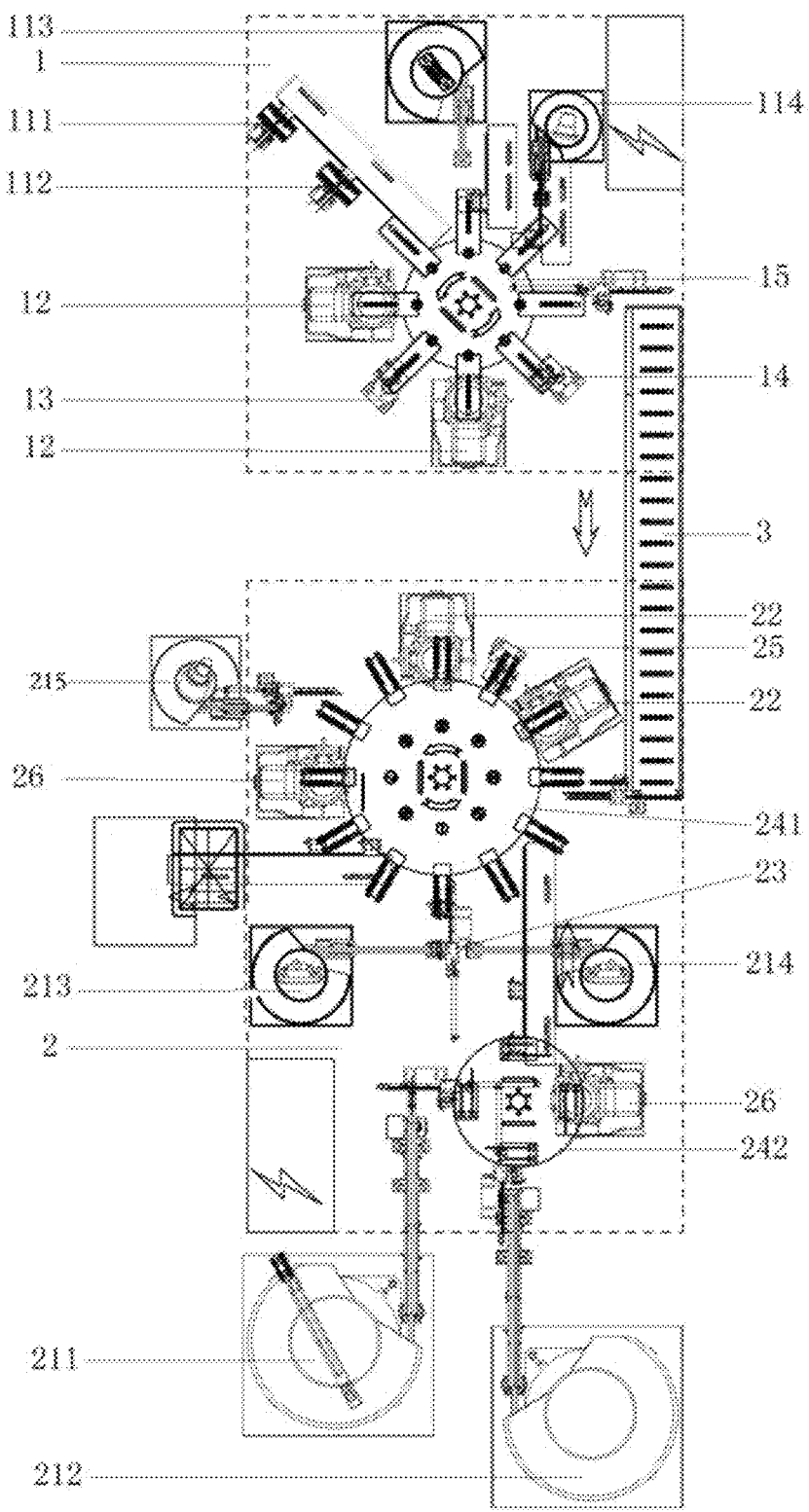
FIG. 2 is a schematic structural view of the automatic assembly equipment for door check in the first embodiment of the present invention.

Referring to FIG. 2, the automatic assembly equipment of door check comprises an L-shaped component semi-finished product assembly device 1 and a finished product assembly device 2, wherein the L-shaped component semi-finished product assembly device 1 and the finished product assembly device 2 are connected through a straight track 3. The L-shaped component semi-finished assembly device 1 comprises a first material feeding device, a first riveting device 12, a first flipping device 13, an oiling device 14 and a first turntable 15, wherein the said first flipping device 13 is a manipulator, and the riveting device 12 is a pressure riveting device; the first material feeding device comprises an inner L-shaped material feeding device 111, an outer L-shaped material feeding device 112, a steel sheet material feeding device 113 and a rivet material feeding device 114, wherein the L-shaped material feeding device 111 and the outer L-shaped material feeding device 112 are both manipulators, and the steel sheet material feeding device 113 and the rivet material feeding device 114 are both vibration plates.

The finished assembly device 2 comprises a second material feeding device, a second riveting device 22, a stopping point testing device 23, a second flipping device 25, a material exporting device, a second large turntable 241, a small turntable 242, and a riveting device 26. The material exporting device comprises a straight track and a finished product testing device, wherein the finished product testing device is a CCD detection system. The second material feeding device comprises a steel bar material feeding device 211, a resilient tab assembly material feeding device 212, a dot stopper material feeding device 213, a non-dot stopper material feeding device 214 and an eccentric rivet material feeding device 215, wherein the steel bar material feeding device 211, the resilient tab assembly feeding device 212, the dot stopper material feeding device 213, the non-dot stopper material feeding device 214, and the eccentric rivet material feeding device 215 are all vibration discs. The second large turntable 241, the small turntable 242, and the first large turntable 15 are provided with a plurality of jigs for holding parts, finished or semi-finished products.

The inner L-shaped material feeding device 111, the outer L-shaped material feeding device 112, the steel sheet material feeding device 113, the rivet material feeding device 114, the two first riveting devices 12, the first flipping device 13, the oiling device 14 are arranged on the corresponding workstations of the first large turntable 15. The steel bar material feeding device 211, the resilient tab assembly material feeding device 212 and the rotary riveting device 26 are mounted on the corresponding workstation of the small turntable 242, and the dot stopper material feeding device 213, the non-dot stopper material feeding device 214, the off-center rivet material feeding device 215, two second riveting devices 22, the stopping point testing device 23, the second flipping device 25, the small dial 242, the material exporting device and a rotary riveting device 26 are arranged in the second turntable 241 corresponding to the workstations.

The L-shaped component semi-finished product assembly device 1 and finished product assembly device 2 are connected through the straight track 3.

The assembly of the automatic assembly equipment for door check is completed as follows:

Please refer to FIGS. 1 to 2, firstly respectively feeding the inner L-shaped component, outer L-shaped component, steel sheet, rivet, steel bar, resilient tab components, eccentric rivet, dot stopper and non-dot stopper into the inner L-shaped material feeding device 111, the outer L-shaped material feeding device 112, the steel sheet material feeding device 113 and the rivet material feeding device 114, the steel bar material feeding device 211, the resilient tab assembly material feeding device 212, the eccentric rivet material feeding device 215, the dot stopper material feeding device 213 and the non-dot stopper material feeding device 214.

Then, the inner L-shaped and outer L-shaped components are tested by the corresponding testing device and access the next workstation, then pressed by the first riveting device 12 at the next workstation and access the next workstation by the first flipping device 13, and after that access to the next workstation by another first riveting equipment 12 and pressed on the opposite, and then oiled by the oiling equipment 14, and finally access to the rear of the workstation, and the steel sheet is pressed against the end of the outer L-shaped component by riveting, and the L-shaped component semi-finished product assembly is completed. The assembled L-shaped components semi-finished product is loaded into the finished product assembly device 2 via the straight track 3.

A steel bar and resilient tab on the small turntable 242 are inserted into the large turntable after being rotary riveted by the rotary riveting device 26, then being assembled with the assembled dot stopper and non-dot stopper, accessing to the next workstation, pressed by the riveting device 22 and inverted by the second flipping device 25 and then pressed by the riveting device 22 again, then assembled with the off-center rivet, rotary riveted by rotary riveting device 26, then finally complete the assembly of the car door stopper, material exporting the normal and abnormal after the material exporting device tested by the material exporting testing device.

Each of the material feeding devices is provided with a CCD testing device for correcting the correctness of the model and the position of the material before the next step of assembly, and correcting the position of the raw material if the position is incorrect.

The foregoing is a detailed implementation of the invention, which is more specific and detailed, but is not to be construed as limits of the invention. It should be noted that various modifications and improvements can be made by those skilled in the art without departing from the spirit of the invention, and these obvious alternative forms are within the scope of the present invention.

What is claimed is:

1. An automatic assembly equipment for door check, characterized in that: it comprises an L-shaped component semi-finished product assembly device (1) and a finished product assembly device (2), wherein the L-shaped component semi-finished product assembly device (1) and the finished product assembly device (2) are connected through a straight track (3); the L-shaped component semi-finished product assembly device (1) comprises a first material feeding device, a first riveting device (12), a first flipping device (13) and a first large turntable (15), wherein the first material feeding device, the first pressure riveting device and the first flipping device are arranged in turn around the first large turntable (15); the finished product assembly device (2) comprises a second material feeding device, a second riveting device, a second flipping devices (25), a material exporting device and a second turntable (241), wherein the second material feeding device, the second riveting device, the second flipping device and the material exporting device are arranged in turn around the second large turntable (241); the L-shaped component assembly semi-finished product device is used for the assembly of the L-shaped component semi-finished product, and the finished product assembly device is used for the assembly of the finished door check.

2. The automatic assembly equipment for door check according to claim 1,
   characterized in that: the first material feeding device comprises an inner L-shaped material feeding device (111), an outer L-shaped material feeding device (112), a steel sheet material feeding device (113) and a rivet material feeding device (114), wherein the inner L-shaped material feeding device (111), the outer L-type feeding device (112), the steel sheet feeding device (113) and the rivet feeding device (114) are arranged in turn on the first turntable (15); the inner L-shaped material feeding device (111), the outer L-shaped material feeding device (112) are both manipulators, and the steel sheet feeding device (113) and the rivet feeding device (114) are both vibration discs.

3. The automatic assembly equipment for door check according to claim 1, characterized in that: the first riveting device (12) is a pressure riveting device, which is used for riveting the inner L-shaped piece, the outer L-shaped piece with the steel sheet.

4. The automatic assembly equipment for door check according to claim 1, characterized in that: the second riveting device comprises a second pressure riveting device (22) and a second rotary riveting device (26), wherein the second pressure riveting device (22) is used for riveting the dot stopper, the non-dot stopper with the L-shaped assembly semi-finished product; the second rotary riveting device (26) is used for riveting the resilient tab with the steel bar and the eccentric rivet with the L-shaped assembly semi-finished product.

5. The automatic assembly equipment for door check according to claim 4, characterized in that: the first riveting device (12) and the second pressure riveting device (26) are both of two pieces, which are respectively mounted on both sides of the first flipping device (13) and the second flipping device (25).

6. The automatic assembly equipment for door check according to claim 1, characterized in that: the second material feeding device comprises a steel bar material feeding device (211), a resilient tab assembly material feeding device (212), a dot stopper material feeding device (213), a non-dot stopper material feeding device (214) and an eccentric rivet material feeding device (215), wherein the steel bar material feeding device (211), the resilient tab assembly feeding device (212), the dot stopper material feeding device (213), the non-dot stopper material feeding device (214), and the eccentric rivet material feeding device (215) are all vibration discs.

7. The automatic assembly equipment for door check according to claim 1, characterized in that: both the first material feeding device and the second material feeding device are provided with a testing device, which is used for detecting the type and the position correction of the raw material.

8. The automatic assembly equipment for door check according to claim 7, characterized in that: the testing device is a CCD testing system.

9. The automatic assembly equipment for door check according to claim 1, characterized in that: the material exporting device comprises a straight track and a finished product testing device, wherein the finished product testing device respectively outputs the good product and the defective product from the straight track after testing.

10. The automatic assembly equipment for door check according to claim 9, characterized in that: the finished product testing device is a CCD testing system.

* * * * *